(12) United States Patent
Peterson et al.

(10) Patent No.: US 11,482,843 B2
(45) Date of Patent: *Oct. 25, 2022

(54) PROCESS OF MANUFACTURING AN ELECTRICAL WIRING ASSEMBLY AND ELECTRICAL WIRING ASSEMBLY MANUFACTURED BY SAID PROCESS

(71) Applicant: Aptiv Technologies Limited, St. Michael (BB)

(72) Inventors: David R. Peterson, Aurora, OH (US); Sean P. Krompegel, Canfield, OH (US); Jonathan D. Weidner, Conneautville, PA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 140 days.

This patent is subject to a terminal disclaimer.

(21) Appl. No.: 16/594,564

(22) Filed: Oct. 7, 2019

(65) Prior Publication Data

US 2020/0112148 A1    Apr. 9, 2020

Related U.S. Application Data

(60) Provisional application No. 62/742,639, filed on Oct. 8, 2018.

(51) Int. Cl.
| | | |
|---|---|---|
| *H01R 43/16* | (2006.01) | |
| *H02G 1/00* | (2006.01) | |
| *H01B 13/06* | (2006.01) | |
| *H02G 15/02* | (2006.01) | |

(52) U.S. Cl.
CPC ............ *H02G 1/005* (2013.01); *H01B 13/06* (2013.01); *H01R 43/16* (2013.01); *H02G 15/02* (2013.01); *Y10T 29/49204* (2015.01)

(58) Field of Classification Search
CPC ............... B21C 47/006; B65H 18/103; B65H 2301/4148; Y10S 428/906; Y10T 29/49792; Y10T 29/49833; Y10T 29/49204; Y10T 29/49224; B26D 1/151
USPC ............... 29/874, 412, 564.6, 871, 882, 885
See application file for complete search history.

(56) References Cited

U.S. PATENT DOCUMENTS

| | | | |
|---|---|---|---|
| 3,299,493 A | | 1/1967 | Gehrt et al. |
| 5,957,734 A | * | 9/1999 | Gladd .................... H01R 13/11 |
| | | | 439/857 |
| 6,000,952 A | | 12/1999 | Gladd et al. |
| 6,319,078 B1 | * | 11/2001 | Thorner ................. H01R 11/12 |
| | | | 439/883 |
| 6,837,751 B2 | | 1/2005 | Vanden Wymelenberg et al. |
| 7,347,738 B2 | | 3/2008 | Hsieh et al. |
| 7,635,212 B2 | | 12/2009 | Seidler |
| 7,645,943 B2 | | 1/2010 | Horiuchi |
| 7,727,022 B2 | | 6/2010 | Polehonki et al. |

(Continued)

FOREIGN PATENT DOCUMENTS

| | | |
|---|---|---|
| JP | S60262372 A | 12/1985 |
| WO | 2019081445 A1 | 5/2019 |

*Primary Examiner* — Thiem D Phan
(74) *Attorney, Agent, or Firm* — RMCK Law Group, PLC

(57) ABSTRACT

A process of manufacturing an electrical wiring assembly includes the steps of cutting an elongate strip from a sheet of metal and cutting a mesial slit in an end of the uninsulated segment, thereby forming a pair of distal projections flanking the mesial slit. The mesial slit and the pair of distal projections form a forked split blade terminal.

17 Claims, 6 Drawing Sheets

(56) References Cited

U.S. PATENT DOCUMENTS

| | | | |
|---|---|---|---|
| 8,105,113 B2 | 1/2012 | Jozwiak | |
| 8,366,451 B2 * | 2/2013 | Littek | H01R 13/112 439/12 |
| 8,488,303 B2 | 7/2013 | De La Reza et al. | |
| 8,556,666 B2 | 10/2013 | Brandon et al. | |
| 9,099,814 B2 | 8/2015 | Snader et al. | |
| 9,282,665 B1 | 3/2016 | Ladanyi et al. | |
| 9,331,413 B2 | 5/2016 | Trujillo et al. | |
| 9,715,986 B2 | 7/2017 | Neto et al. | |
| 9,750,151 B2 | 8/2017 | Morales et al. | |
| 2014/0197144 A1 * | 7/2014 | Earhart | B23K 26/0846 219/121.72 |

* cited by examiner

PROCESS OF MANUFACTURING AN ELECTRICAL WIRING ASSEMBLY AND ELECTRICAL WIRING ASSEMBLY MANUFACTURED BY SAID PROCESS

CROSS-REFERENCE TO RELATED APPLICATION

This application claims the benefit under 35 U.S.C. § 119(e) of U.S. Provisional Patent Application No. 62/742,639 filed on Oct. 8, 2018, the entire disclosure of which is hereby incorporated by reference.

TECHNICAL FIELD OF THE INVENTION

The invention generally relates to a process of manufacturing an electrical wiring assembly and an electrical wiring assembly that is manufactured by this process.

BACKGROUND OF THE INVENTION

Traditional processes for manufacturing electrical wiring assemblies include crimping a separate terminal onto an end of a wire cable using an automatic cutter/crimper machine. The cables and terminals are either produced or are purchased by the wiring assembly manufacturer. A large terminal inventory may need to be managed due to all the unique terminals that may be used (male vs. female terminals, different terminal designs, different terminal suppliers, etc.). A large cable inventory is also required to be managed due to different cable gauge sizes and color and/or patterns of the insulating jacket of the cables used to identify the individual electrical wiring assemblies. Hundreds of different terminals types and cable types could be used in a single wiring harness that contains a plurality of wiring assemblies.

BRIEF SUMMARY OF THE INVENTION

According to one implementation of the invention, process of manufacturing an electrical wiring assembly is provided. The process includes the steps of cutting an elongate strip from a sheet of metal and cutting a mesial slit in an end of the strip, thereby forming a pair of distal projections flanking the mesial slit.

In an example implementation having one or more features of the process of the previous paragraph, the mesial slit and the pair of distal projections form a forked split blade terminal.

In an example implementation having one or more features of the process of the previous paragraph, the steps of the process are performed using a laser cutting process.

In an example implementation having one or more features of the process of the previous paragraph, the process further includes the step of forming an insulative covering over a portion of the elongate strip by laminating the portion of the elongate strip with an insulative material, wherein the portion is an insulated segment and a remaining portion of the elongate strip is an uninsulated segment.

In an example implementation having one or more features of the process of the previous paragraph, the process further includes the step of cutting the elongate strip into a desired shape. This step of the process may be performed prior to step of forming the insulative covering.

In an example implementation having one or more features of the process of the previous paragraph, the process further includes the step of folding the elongate strip into a desired shape. This step may be performed prior to the step of cutting the mesial slit in an end of the strip.

In an example implementation having one or more features of the process of the previous paragraph, the process further includes the step of bending the electrical wiring assembly into a desired shape.

In an example implementation having one or more features of the process of the previous paragraph, the process further includes the step of winding the sheet of metal from a first reel onto a second reel that is spaced apart from the first reel. This step may be performed concurrently with the step of cutting an elongate strip from a sheet of metal.

In an example implementation having one or more features of the process of the previous paragraph, the sheet of metal is formed of a copper-based metal.

According to another implementation of the invention, an electrical wiring assembly is provided. The electrical wiring assembly is manufactured by a process that includes the steps of cutting an elongate strip from a sheet of metal and cutting a mesial slit in an end of the strip, thereby forming a pair of distal projections flanking the mesial slit.

In an example implementation having one or more features of the electrical wiring assembly of the previous paragraph, the mesial slit and the pair of distal projections form a forked split blade terminal.

In an example implementation having one or more features of the electrical wiring assembly of the previous paragraph, the steps of the process are performed using a laser cutting process.

In an example implementation having one or more features of the electrical wiring assembly of the previous paragraph, the process further includes the step of forming an insulative covering over a portion of the elongate strip by laminating the portion of the elongate strip with an insulative material, wherein the portion is an insulated segment and a remaining portion of the elongate strip is an uninsulated segment.

In an example implementation having one or more features of the electrical wiring assembly of the previous paragraph, the process further includes the step of cutting the elongate strip into a desired shape. This step of the process may be performed prior to step of forming the insulative covering.

In an example implementation having one or more features of the electrical wiring assembly of the previous paragraph, the process further includes the step of folding the elongate strip into a desired shape. This step may be performed prior to the step of cutting the mesial slit in an end of the strip.

In an example implementation having one or more features of the electrical wiring assembly of the previous paragraph, the process further includes the step of bending the electrical wiring assembly into a desired shape.

In an example implementation having one or more features of the electrical wiring assembly of the previous paragraph, the process further includes the step of winding the sheet of metal from a first reel onto a second reel that is spaced apart from the first reel. This step may be performed concurrently with the step of cutting an elongate strip from a sheet of metal.

In an example implementation having one or more features of the electrical wiring assembly of the previous paragraph, the sheet of metal is formed of a copper-based metal.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
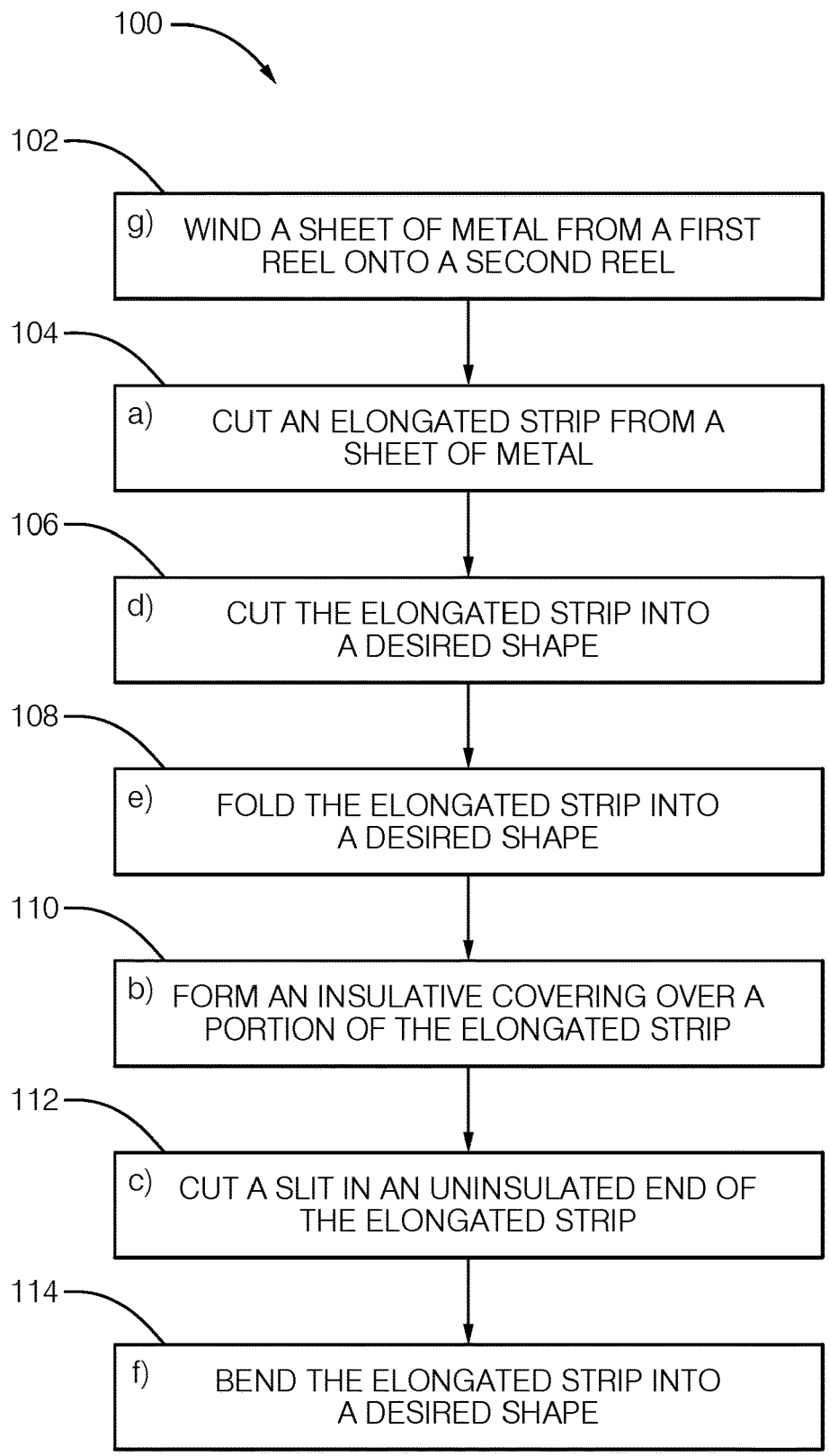
FIG. 1 is a flow chart of a process of manufacturing an electrical wiring assembly, according to one embodiment of the invention.
Figure 2:
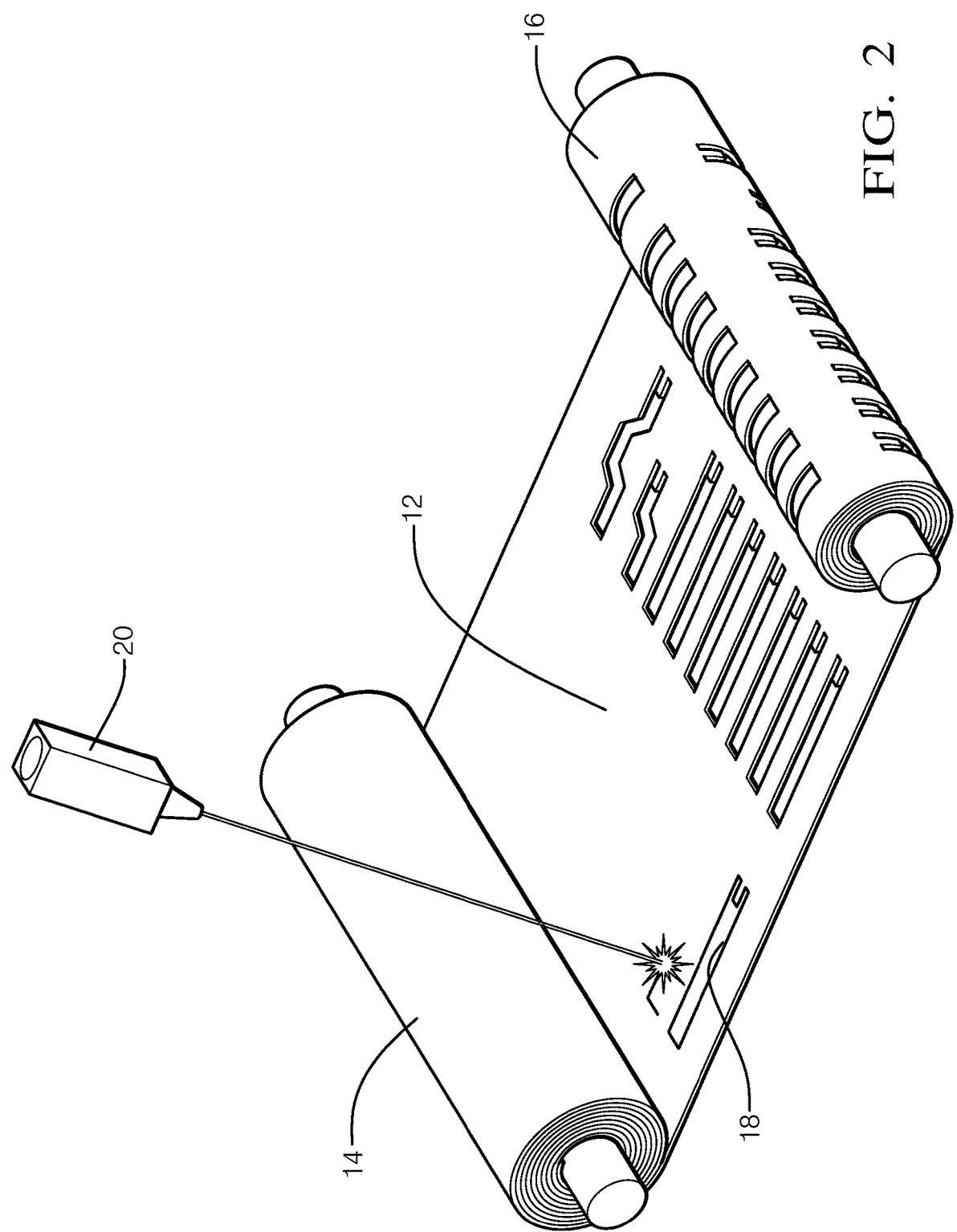
FIG. 2 is a schematic view of an elongate strip being cut from a sheet of metal wound between two reels by the process of FIG. 1, according to one embodiment of the invention.
Figure 3B:
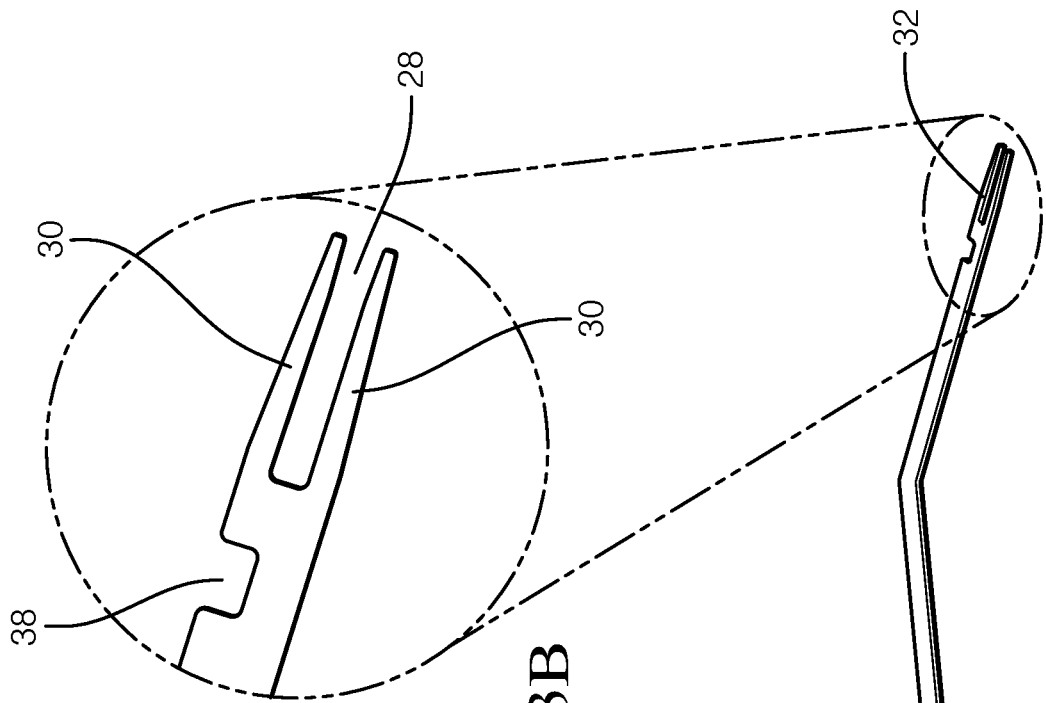
FIG. 3B is a close up perspective view of an uninsulated end of the elongate strip cut to form a terminal by the process of FIG. 1, according to one embodiment of the invention.
Figure 3A:
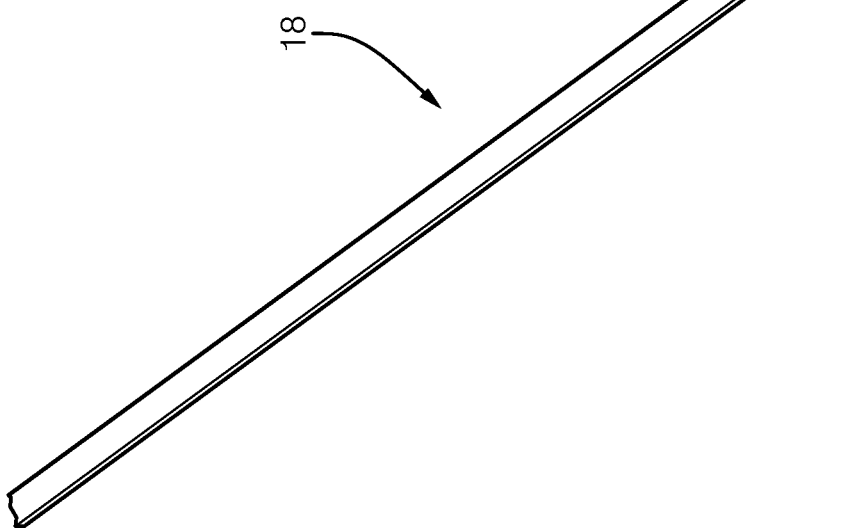
FIG. 3A is a perspective view of an elongate strip cut into a desired shape by the process of FIG. 1, according to one embodiment of the invention.
Figure 4:
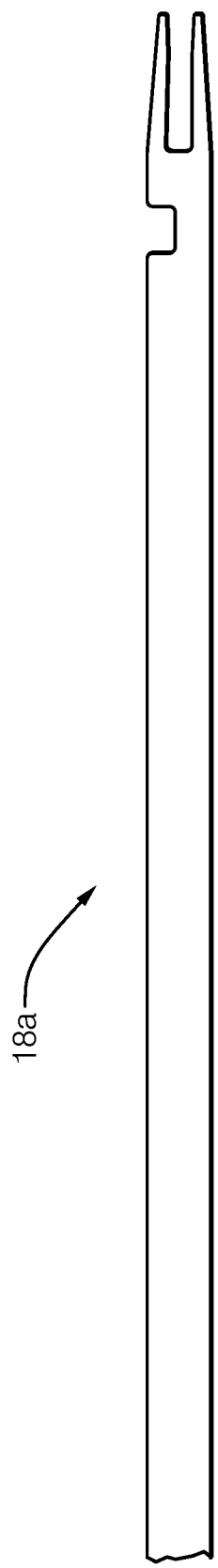
FIG. 4 is a top view of an elongate strip formed from a sheet of metal by the process of FIG. 1, according to one embodiment of the invention.
Figure 5:
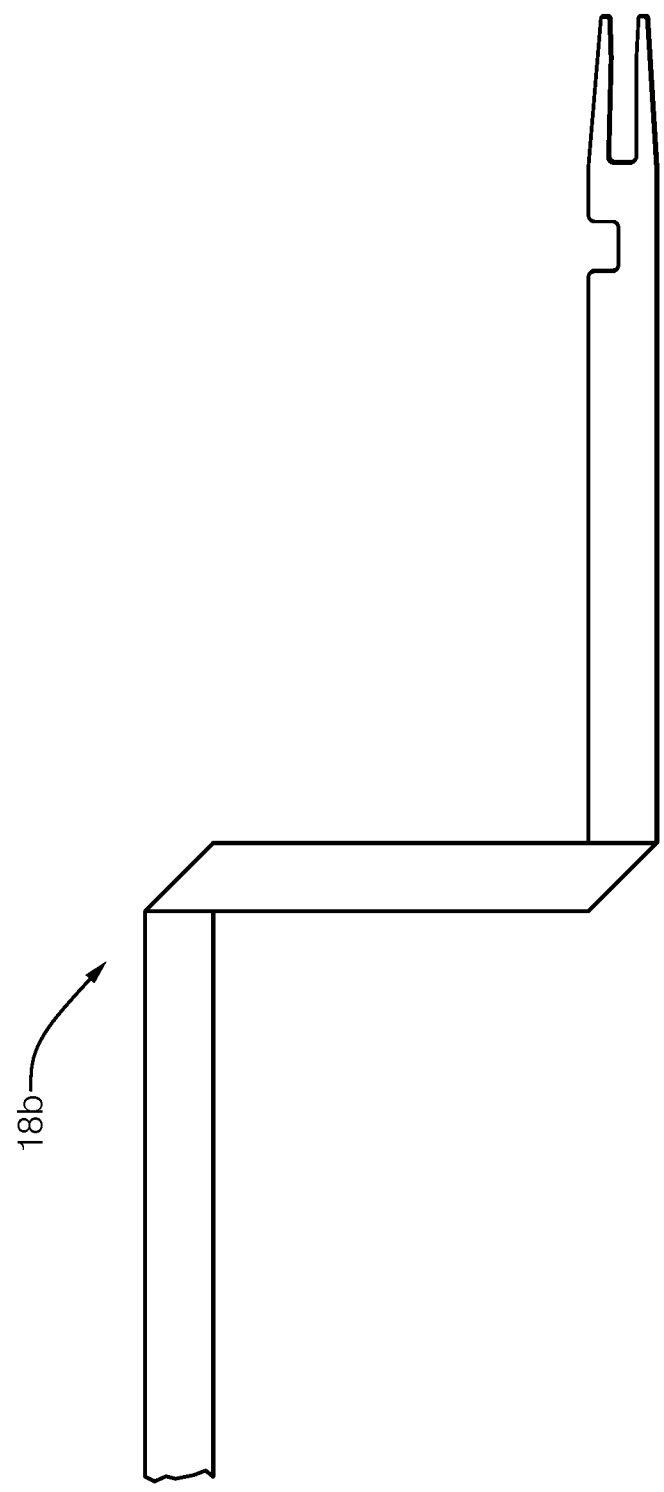
FIG. 5 is a top view of an elongate strip folded into a desired shape by the process of FIG. 1, according to one embodiment of the invention.
Figure 6A:
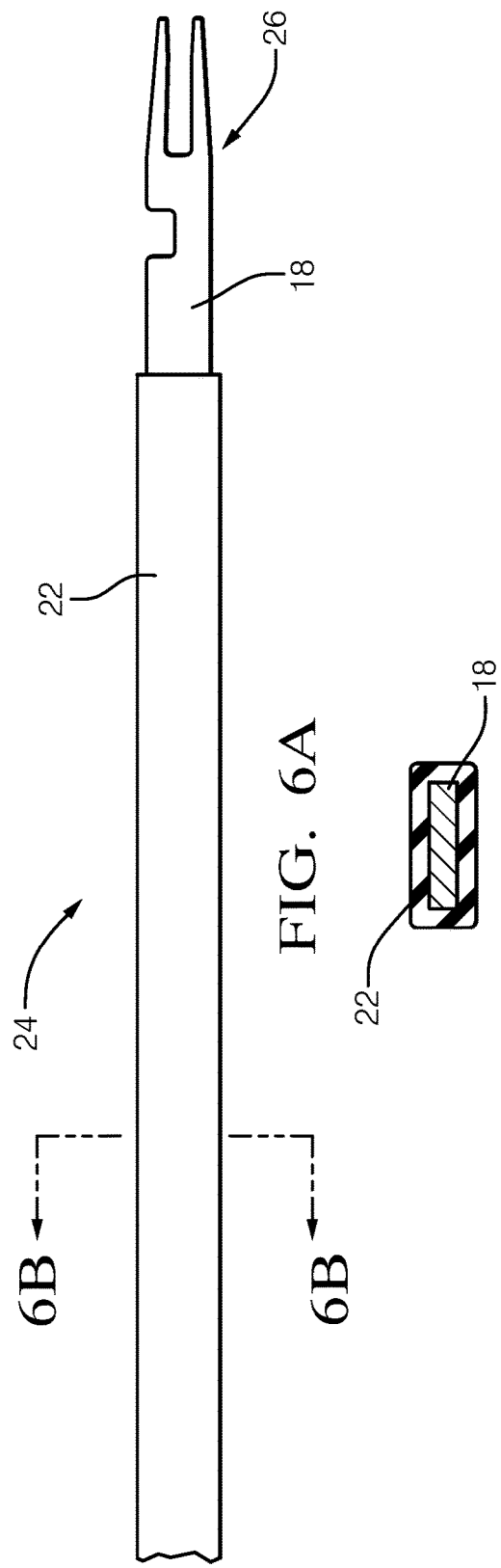
FIG. 6A is a top view of an elongate strip in which a portion of the elongate strip is laminated with an insulative material by the process of FIG. 1, according to one embodiment of the invention.
Figure 6B:
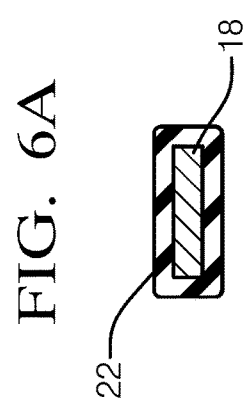
FIG. 6B is a cross section view of the elongate strip of FIG. 6A, according to one embodiment of the invention.
Figure 7A:
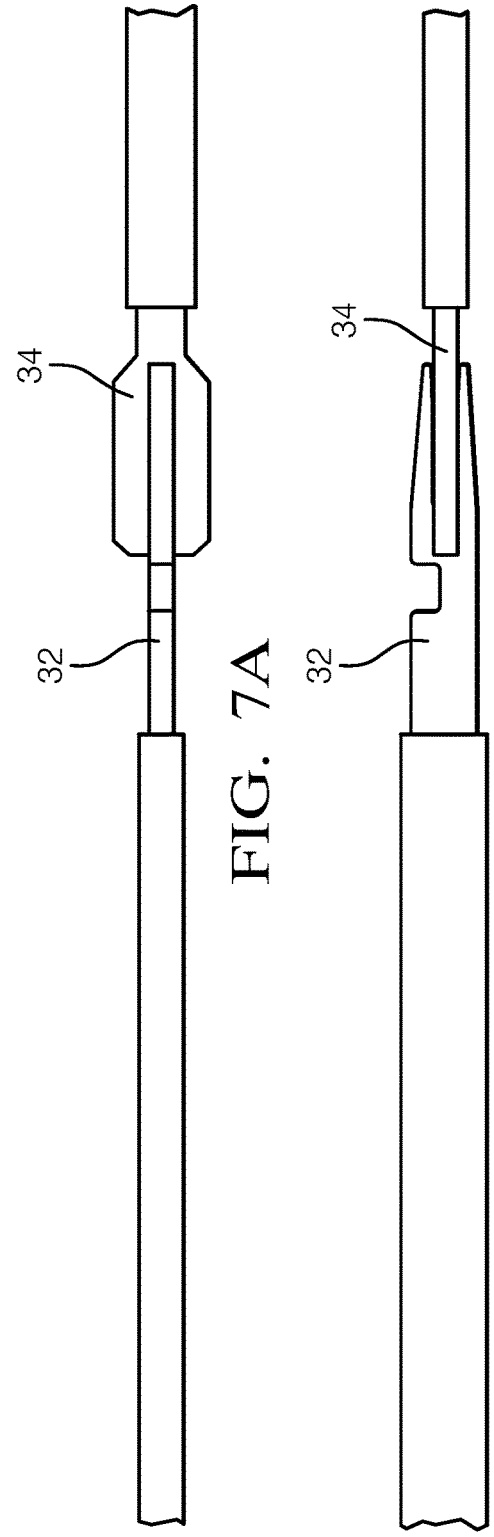
FIG. 7A is a side view of an electrical wiring assembly manufactured by the process of FIG. 1 interconnected with a male blade terminal, according to one embodiment of the invention.
Figure 7B:
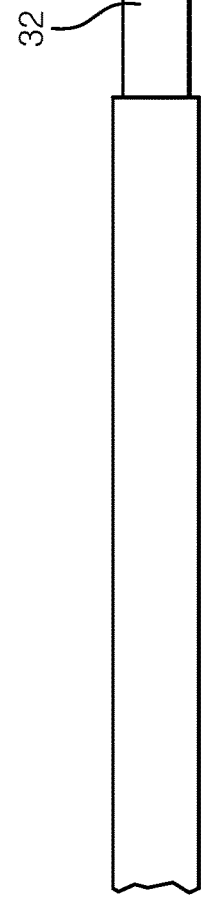
FIG. 7B is a top view of an electrical wiring assembly manufactured by the process of FIG. 1 interconnected with a male blade terminal, according to one embodiment of the invention.
Figure 8A:
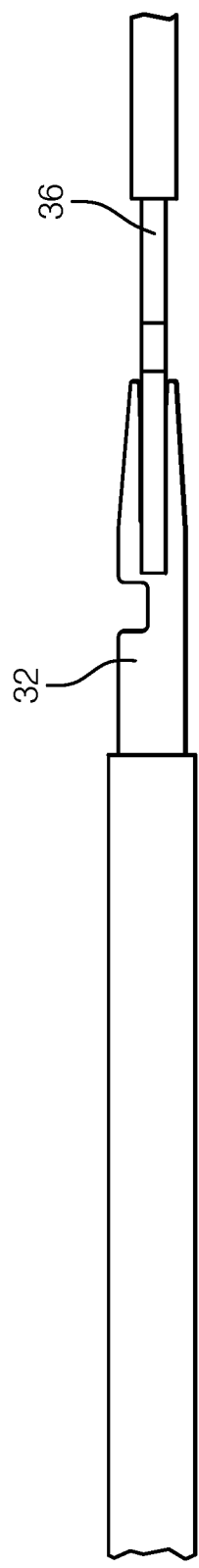
FIG. 8A is a side view of an electrical wiring assembly manufactured by the process of FIG. 1 interconnected with another electrical wiring assembly manufactured by the process of FIG. 1, according to one embodiment of the invention.
Figure 8B:
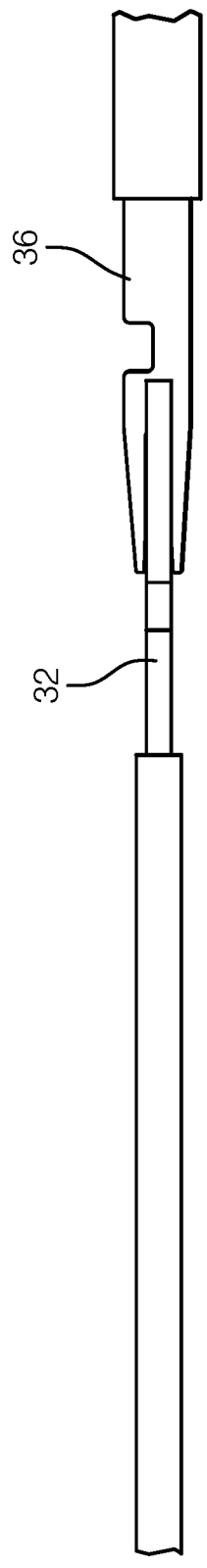
FIG. 8B is a top view of an electrical wiring assembly manufactured by the process of FIG. 1 interconnected with another electrical wiring assembly manufactured by the process of FIG. 1, according to one embodiment of the invention.
Figure 9:
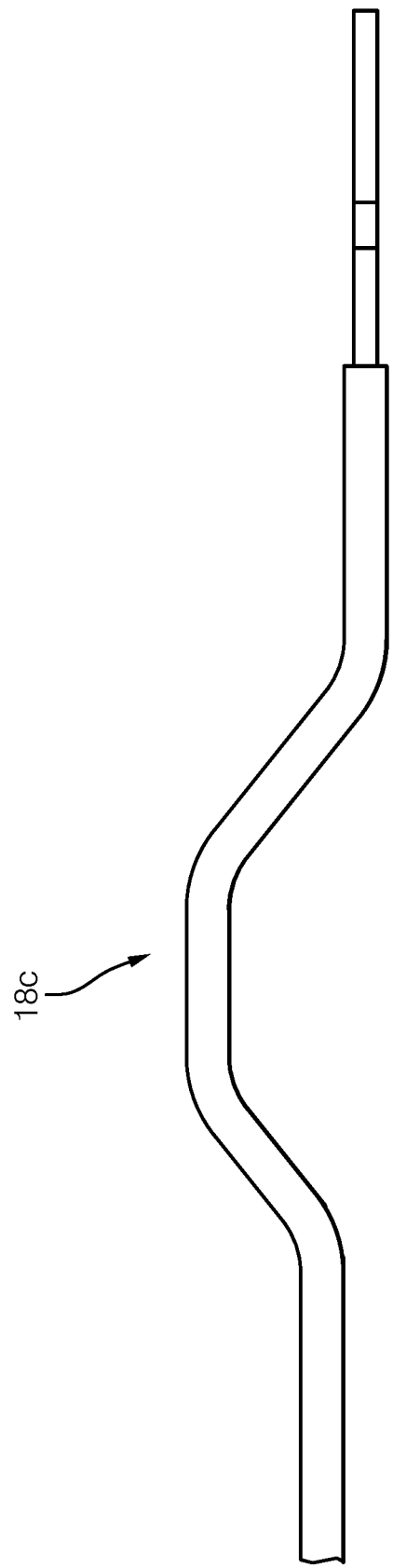
FIG. 9 is a top view of an electrical wiring assembly manufactured by the process of FIG. 1 bent into a desired shape by the process of FIG. 1, according to one embodiment of the invention.

FIG. 1 illustrates process 100 of manufacturing an electrical wiring assembly. The process includes the following steps:

STEP 102, WIND A SHEET OF METAL FROM A FIRST REEL ONTO A SECOND REEL, is an optional step that includes winding a sheet of metal, hereinafter referred to as the sheet 12, from a first reel 14 onto a second reel 16 that is spaced apart from the first reel 14 as shown in FIG. 2;

STEP 104, CUT AN ELONGATE STRIP FROM A SHEET OF METAL, includes cutting an elongate strip, as shown in FIG. 3A and hereinafter referred to as the strip 18, from the sheet 12 as shown in FIG. 2. The sheet 12 is preferably formed of a copper-based material in which copper is the principal constituent. The strip 18 is preferably cut from the sheet 12 using a laser 20 in a cutting process as also shown in FIG. 2. The strip 18 may fall away after being cut from the sheet 12, producing holes in the sheet 12 as the sheet 12 is wound about the second reel 16. The remaining sheet material on the second reel 16 may then be recycled. Laser cutting the strip 18 for the sheet 12 provides the benefit of eliminating dedicated tooling for cutting the sheet 12. Alternatively; the strip 18 may be cut from the sheet 12 by stamping or blanking processes;

STEP 106, CUT THE ELONGATE STRIP INTO A DESIRED SHAPE, is an optional step that includes cutting the strip 18 into a desired shape. The desired shape may be a nonlinear strip 18 as shown in FIG. 3A or a straight strip 18*a* as shown in FIG. 4;

STEP 108, FOLD THE ELONGATE STRIP INTO A DESIRED SHAPE, is an optional step that includes folding the straight strip 18*a* of FIG. 4 into a nonlinear strip 18*b* shape as shown in FIG. 5. STEP 108 is preferably performed before STEP 110;

STEP 110, FORM AN INSULATIVE COVERING OVER A PORTION OF THE ELONGATE STRIP, includes forming an insulative covering 22 over a portion 24 of the elongate strip by laminating or coating the portion of the elongate strip with an insulative material, such as a polymeric material, so that the insulative material surrounds the portion of the strip as shown in FIGS. 6A and 6B. This coated portion 24 becomes an insulated segment 24 and the remaining portion of the strip becomes an uninsulated segment 26. As shown in FIG. 6B, the strip 18 has a substantially rectangular cross section. The width and/or thickness of the strip may be manipulated to provide adequate current carrying capacity for the circuit in which the strip is used;

STEP 112, CUT A SLIT IN AN UNINSULATED END OF THE ELONGATE STRIP, includes cutting a mesial slit 28 in an end of the uninsulated segment 26, thereby forming a pair of distal projections 30 flanking the mesial slit 28 which provides a terminal 32 for an electrical wiring assembly as shown in FIG. 3B. The terminal formed is typically referred to as a "tuning fork" female terminal due to its resemblance to a tuning fork. The interior ends of the projections 30 are tapered to enhance the ability of inserting a male blade type terminal 34 as shown in FIGS. 7A and 7B within the slit to provide an electrical connection. As shown in FIGS. 8A and 8B, the terminal may also receive another "tuning fork" terminal 36 that is rotated 90 degrees. Although the figures also illustrate the terminal 32 on only one end of the strip 18, it should be understood that a similar terminal could be formed on the opposite end of the strip. STEP 112 is preferably performed concurrently with step 104 but may be performed after STEP 110. As shown in FIG. 3B, a notch 38 may be cut into a distal edge of the strip to form a retaining feature configured to cooperate with a terminal lock in a connector body (not shown) to retain the terminal end within the connector body; and STEP 114, BEND THE ELONGATE STRIP INTO A DESIRED SHAPE, is an optional step that includes bending the strip 18c into a desired shape as shown in FIG. 9. STEP 114 is preferably performed after STEP 110, but may also be performed before STEP 110.

Accordingly, process for manufacturing an electrical wiring assembly is provided. The process provides the benefit of eliminating inventory separate wire cables and terminals and the time and labor required to attach these to create an electrical wiring assembly. The process further provides the benefit of producing wiring assemblies having different current carrying capabilities from a sheet of material having a single thickness by varying the width of the strips cut from the sheet.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A process of manufacturing an electrical wiring assembly, comprising the steps of:
    a) cutting an elongate strip from a sheet of metal;
    b) cutting a mesial slit in an end of the strip, thereby forming a pair of distal projections flanking the mesial slit;
    c) forming an insulative covering over a portion of the elongate strip by laminating the portion of the elongate strip with an insulative material, wherein the portion is an insulated segment and a remaining portion of the elongate strip is an uninsulated segment; and
    d) cutting the elongate strip into a desired shape, wherein step d) of the process is performed prior to step c) of the process.

2. The process according to claim 1, wherein the mesial slit and the pair of distal projections form a forked split blade terminal.

3. The process according to claim 1, wherein steps a) and b) of the process are performed using a laser cutting process.

4. The process according to claim 1, further comprising the step of:
    e) folding the elongate strip into a desired shape.

5. The process according to claim 1, further comprising the step of:
    f) bending the electrical wiring assembly into a desired shape.

6. The process according to claim 1, further comprising the step of:
    g) winding the sheet of metal from a first reel onto a second reel that is spaced apart from the first reel.

7. The process according to claim 6, wherein step a) of the process is preformed concurrently with step g) of the process.

8. The process according to claim 1, further comprising the step of:
    cutting a notch into a distal edge of the elongate strip to form a retaining feature configured to cooperate with a terminal lock in a connector body to retain a terminal end of the electrical wiring assembly within the connector body.

9. The process according to claim 8, wherein the steps of cutting the elongate strip, cutting the mesial slit, and cutting the notch are all performed using a single laser cutting process.

10. An electrical wiring assembly, formed by a process comprising the steps of:

a) cutting an elongate strip from a sheet of metal;
b) cutting a mesial slit in an end of the strip, thereby forming a pair of distal projections flanking the mesial slit;
c) forming an insulative covering over a portion of the elongate strip by laminating the portion of the elongate strip with an insulative material, wherein the portion is an insulated segment and a remaining portion of the elongate strip is an uninsulated segment;
d) cutting the elongate strip into a desired shape, wherein step d) of the process is performed prior to step b) of the process.

11. The electrical wiring assembly according to claim 10, wherein the mesial slit and the pair of distal projections form a forked split blade terminal.

12. The electrical wiring assembly according to claim 10, wherein steps a) and b) of the process are performed using a laser cutting process.

13. The electrical wiring assembly according to claim 10, wherein the process further comprises the step of:
e) folding the elongate strip into a desired shape.

14. The electrical wiring assembly according to claim 10, wherein the process further comprises the step of:
f) bending the electrical wiring assembly into a desired shape.

15. The electrical wiring assembly according to claim 10, wherein the process further comprises the step of:
g) winding the sheet of metal from a first reel onto a second reel spaced apart from the first reel.

16. A method of manufacturing an electrical wiring assembly, the method comprising:
cutting an elongate strip from a sheet of metal;
cutting a mesial slit in an end of the strip, thereby forming a pair of distal projections flanking the mesial slit;
cutting the elongate strip into a desired shape; and
after cutting the elongate strip into the desired shape, forming an insulative covering over a portion of the elongate strip by laminating the portion of the elongate strip with an insulative material, wherein the portion is an insulated segment and a remaining portion of the elongate strip is an uninsulated segment.

17. The method of claim 16, further comprising cutting a notch into a distal edge of the elongate strip to form a retaining feature configured to cooperate with a terminal lock in a connector body to retain a terminal end of the electrical wiring assembly within the connector body.

* * * * *